US00RE39259E

(19) United States
(12) Reissued Patent
Mills et al.

(10) Patent Number: US RE39,259 E
(45) Date of Reissued Patent: Sep. 5, 2006

(54) APPARATUS AND METHOD FOR PROVIDING ELECTRICAL TRANSMISSION OF POWER AND SIGNALS IN A DIRECTIONAL DRILLING APPARATUS

(75) Inventors: Matthew A. Mills, Pella, IA (US); Gregg Austin, Pella, IA (US)

(73) Assignee: Vermeer Manufacturing Company, Pella, IA (US)

(21) Appl. No.: 10/819,886

(22) Filed: Apr. 6, 2004

Related U.S. Patent Documents

Reissue of:
(64) Patent No.: 6,367,564
Issued: Apr. 9, 2002
Appl. No.: 09/405,541
Filed: Sep. 24, 1999

(51) Int. Cl.
*E21B 17/02* (2006.01)

(52) U.S. Cl. ..... 175/40; 175/320
(58) Field of Classification Search ..... 175/40, 175/51, 320; 166/242.6, 66; 340/853.3, 853.4, 340/855.1, 854.9, 855.2
See application file for complete search history.

(56) References Cited

U.S. PATENT DOCUMENTS 3,170,137 A * 2/1965 Brandt ..... 340/855.1
3,398,392 A * 8/1968 Henderson ..... 439/201
3,879,097 A * 4/1975 Oertle ..... 340/855.1
4,220,381 A * 9/1980 van der Graaf ..... 340/853.7
4,483,393 A * 11/1984 More et al. ..... 166/65.1
4,827,425 A * 5/1989 Linden ..... 700/225
4,881,083 A * 11/1989 Chau et al. ..... 342/459
4,986,350 A * 1/1991 Czernichow ..... 166/65.1
5,070,462 A * 12/1991 Chau ..... 701/300
5,155,442 A * 10/1992 Mercer ..... 324/690
5,332,048 A * 7/1994 Underwood et al. ..... 175/26
5,337,002 A * 8/1994 Mercer ..... 324/326
5,444,382 A * 8/1995 Mercer ..... 324/690
5,467,083 A * 11/1995 McDonald et al. ..... 340/854.6
5,468,153 A * 11/1995 Brown et al. ..... 439/13
5,633,589 A * 5/1997 Mercer ..... 324/326
5,698,981 A * 12/1997 Mercer ..... 324/329
5,720,354 A * 2/1998 Stump et al. ..... 175/26
5,726,359 A * 3/1998 Zeller et al. ..... 73/514.33
5,757,190 A * 5/1998 Mercer ..... 324/326
5,767,678 A * 6/1998 Mercer ..... 324/326
6,079,506 A * 6/2000 Mercer ..... 175/45
6,150,822 A * 11/2000 Hong et al. ..... 324/338
6,223,826 B1 * 5/2001 Chau et al. ..... 166/380
6,670,880 B1 12/2003 Hall et al.

OTHER PUBLICATIONS

Rogers, J., et al., "Very High–Speed Drill String Communications Network: An Enabling Technology," *GasTIPS*, pp. 4–7 (Spring 2003).
"DOE–Industry Breakthrough Turns Drilling System Into Lightning Fast Computer Network, Energy Department Cites Remarkable Advance In 'Smart' Oil, Gas Drilling," http://www.fossil.energy.gov/news/techlines/02/tl_intellipipe.html, 3 pages (Date Unknown).

* cited by examiner

*Primary Examiner*—Jennifer H. Gay
(74) *Attorney, Agent, or Firm*—Merchant & Gould P.C.

(57) ABSTRACT

The apparatus, system and method is capable of providing power from a directional or vertical drilling apparatus at an origin above the ground to an electronic device located in a drill head of the directional or vertical drilling apparatus located below the ground. The apparatus, system and method is also capable of providing an electrical signal from below ground back to the origin, above ground, from the electronic device. Accordingly, the mechanism for feeding electrical power down a hole to the electronic device located in the drill head and transmitting a signal back to the origin, greatly enhances the drilling process making it faster, more reliable and more efficient.

68 Claims, 10 Drawing Sheets

A–A

B–B

APPARATUS AND METHOD FOR PROVIDING ELECTRICAL TRANSMISSION OF POWER AND SIGNALS IN A DIRECTIONAL DRILLING APPARATUS

Matter enclosed in heavy brackets [ ] appears in the original patent but forms no part of this reissue specification; matter printed in italics indicates the additions made by reissue.

BACKGROUND

The present invention relates generally to directional or horizontal drilling devices. More particularly, the present invention relates to an electrical transmission line for use with directional or horizontal drilling machines.

Directional or horizontal drilling machines are used to drill holes along a generally horizontal path beneath the ground. After a hole is drilled, the hole is back reamed and then a length of cable or the like can be passed through the hole. Such directional drilling machines eliminate the need for digging a long trench to lay a length of cable or the like.

A typical directional drilling machine includes an elongated track that can be aligned at an inclined orientation relative to the ground. A drill head is mounted on the track so as to be moveable along the length of the track. The drill head includes a drive member that is rotated about a drive axis that is generally parallel to the track. The drive member is adapted for connection to a length of pipe, or drill stem. For example, the drive member can include a threaded end having either female or male threads.

To drill a hole using the directional drilling machine, the track is oriented at an inclined angle relative to the ground, and the drill head is retracted to an upper end of the track. Next, a length of drill stem is unloaded from a magazine and is coupled to the drive member of the drill head. Once the drill stem is connected to the drill head, the drill head is driven in a downward direction along the inclined track. As the drill head is driven downward, the drive member is concurrently rotated about the drive axis. Typically, a cutting element or drilling/boring member, is mounted at the distal end of the drill stem on the drill head. Consequently, as the drill head is driven down the track, the rotating drill stem is pushed into the ground thereby causing the drill stem to drill or bore a hole. By stringing multiple drill stems together, it is possible to drill holes having relatively long lengths.

After drilling a hole, it is common for a back reamer to be connected to the end of the drill string. Once the back reamer is connected to the end of the drill string, the directional drilling apparatus is used to pull the string of drill stems back toward the drilling machine. As the string of drill stems is pulled back toward the drilling machine, the reamer enlarges the pre-drilled hole, and the drill stems are individually uncoupled from the drill string and loaded back into the magazine of the directional drilling machine.

In order to accurately guide the drill string, an operator must monitor the position of the drill head. The principal means for locating the position of the drill head for guiding it is to equip the drill head with an electronic device that emits electromagnetic energy. Typically, the electronic device is a radio transmitter or sonde mounted within the drill head. The sonde emits electromagnetic energy at radio frequencies which can be detected above the ground by an operator using an electromagnetic wave detection device, or the like, tuned to the same radio frequency emitted by the sonde. Accordingly, by providing feedback of the drill head's position, the drilling machine operator can make the required adjustments such that the hole is bored at the proper depth and in the proper direction.

Electrical power required to operate the sonde has typically been supplied via a conventional wire line, or a battery placed within the drill head. Several problems are associated with the conventional wire line in that it is cumbersome to feed the wire line through the drill stem. In order to extend the drill string, sections of drill stem are added at the drive head of the drilling machine. Therefore, a new length of wire must be spliced or connected to a previous length or wire in the drill string. This takes time and is not generally an efficient process, thus reducing the overall productivity and slowing down the drilling process.

Providing power to the sonde via a battery is problematic in that the energy delivered to the sonde is limited to the energy capacity of the battery. Therefore, the output signal strength emitted by the sonde is practically limited to the battery's energy capacity. Since electromagnetic waves are emitted from a source (the sonde) beneath the ground, they are greatly attenuated by the time they reach the detection device above ground. Accordingly, it is desirable to increase the energy or power delivered to the sonde to increase the strength of the electromagnetic waves emitted therefrom.

For the foregoing reasons, there is a need for an apparatus, system and method capable of providing electrical power to an electronic device located within a drill head of a drilling machine that greatly enhances the productivity of the drilling process. Furthermore, there is a need for providing power to the electronic device that is not limited by the energy capacity of a battery.

SUMMARY

The invention is directed to an apparatus, system and method that satisfies the need identified above. The apparatus, system and method having features of the invention is capable of providing power from an origin above the ground to an electronic device located below the ground. The apparatus, system and method having features of the invention is also capable of providing electrical signals between the origin (above ground) and the electronic device located below ground. Having these capabilities greatly enhances the drilling process, thus making it faster, more reliable and more efficient.

One aspect of the invention relates to a drill head that forms a portion of a drill string for boring a hole through the ground. The drill head has a member that has a generally longitudinally extending housing and includes an outer surface, an inner surface defining a hollow passage therethrough and further defining a chamber, a first end adapted and configured for boring through the ground and a second end adapted and configured to be coupled to a starter rod or a drill stem. An electrically conductive ring is radially disposed about a distal end of the second end and an electrically insulative ring is radially disposed about the second end and located proximate to the electrically conductive ring. An electrical conductor encapsulated by an electrically insulative material is disposed within the hollow passage. The electrical conductor is electrically connectable between the conductive ring and an electronic device disposed within the chamber. The electrically insulative ring provides electrical isolation between the conductive ring and the outer surface of the drill head. The electrically insulative material provides electrical isolation between the electrical conductor and the inner surface of the hollow passage.

Another aspect of the invention relates to a drill pipe that forms a portion of a drill string for boring a hole through the ground. The drill pipe has a member having a generally longitudinally extending housing including an outer surface, an inner surface defining a hollow passage therethrough and first and second ends adapted and configured to be coupled to a second member. The drill pipe also includes first and second electrically conductive rings that are radially disposed about first and second distal ends of the member. The drill pipe also includes first and second electrically insulative rings that are radially disposed about the first and second ends and proximate to the first and second electrically conductive rings and an electrical conductor encapsulated by an electrically insulative material. The electrical conductor is disposed within the hollow passage and is electrically connectable between the first and second conductive rings and the first and second electrically insulative rings. The electrically insulative rings provide electrical isolation between the first and second conductive rings and the outer surface of the starter rod. The electrically insulative material provides electrical isolation between the electrical conductor and the inner surface of the hollow passage.

A further aspect of the invention relates to a drill string for boring a hole through the ground having one end adapted and configured to be coupled to a drilling apparatus. The drill string includes one or more members having generally longitudinally extending housings, each of the housings including an outer surface and an inner surface defining a hollow passage therethrough and first and second ends adapted and configured to be coupled to a drill head, a drill stem or a starter rod. The drill string also includes electrical connection means between each end of the members. Electrical insulation means between the electrical connections and the outer surfaces of each the members and one or more electrical conductors encapsulated by an electrically insulative material, each electrical conductor being disposed within the hollow passage of each of the members and are electrically connected through the electrical connection means to an electrical conductor of an adjacent member throughout the length of the drill string.

Yet another aspect of the invention relates to a drilling apparatus for boring a hole through the ground. The drilling apparatus includes a frame having a longitudinal axis extending from a first frame end to a second frame end, a drill string having a first end adapted and configured to be coupled to the drilling apparatus and a second end adapted and configured for boring a hole through the ground. The drill string further includes one or more adjacently disposed members including electrical connection means disposed therebetween. The electrical connection means provide electrical continuity between the members. The drilling apparatus also includes a drive mechanism mounted on the frame for movement along the longitudinal axis and the drill string is connected to the drive mechanism for the drive mechanism to rotate the drill string and to longitudinally advance and retract the drill string in response to the drive mechanism moving along the longitudinal axis. The drilling apparatus also includes means for providing electrical continuity between a first and second ends of the drill string.

Still a further aspect of the invention relates to drilling apparatus for boring a hole through the ground. The drilling apparatus includes a frame having a longitudinal axis extending from a first frame end to a second frame end, a drill string having a first end adapted and configured to be coupled to the drilling apparatus and a second end adapted and configured for boring a hole through the ground. The drill string further includes one or more adjacently disposed members and signal flow path connection means disposed therebetween. The signal flow path connection means providing signal continuity between the members. The drilling apparatus also includes a drive mechanism mounted on the frame for movement along the longitudinal axis and the drill string is connected to the drive mechanism for the drive mechanism to rotate the drill string and to longitudinally advance and retract the drill string in response to the drive mechanism moving along the longitudinal axis. The drilling apparatus also includes one or more signal flow path means disposed within the drill string. The signal flow path means providing electrical signal continuity between first and second ends of each member and first and second ends of the drill string.

Still another aspect of the invention relates to a method of providing an electrical connection throughout the length of a drill string. The drill string includes one or more members having generally longitudinally extending housings. Each housing member includes an outer surface and an inner surface defining a hollow passage therethrough. The first and second ends of each member are adapted and configured to be coupled to a drill head, a drill stem or a starter rod. The drill string also includes electrical connection means between ends of each of the members and electrical insulation means between the electrical connection means and the outer surfaces of each of the members. The drill string also includes one ore more electrical conductors encapsulated by an electrically insulative material and each electrical conductor is disposed within the hollow passage of each of the members and are electrically connected through the electrical connection means to an electrical conductor of an adjacent member throughout the length of the drill sting. The method includes moving a first member into coaxial alignment with a drill axis, coupling a second member to the first member and engaging electrical connection means between adjacent ends of the members while coupling the first member to the second member.

Yet another aspect of the invention relates to a system for locating a drill head located below the ground from a location above the ground. The system includes a drilling apparatus, a drill string arranged and configured to be coupled to the drilling apparatus at one end and coupled to a drill head at another end, said drill string further including one or more members having generally longitudinally extending housings, each of the housings include an outer surface and an inner surface defining a hollow passage therethrough and first and second ends adapted and configured to be coupled to a drill head, a drill stem or a starter rod. The drill string also includes electrical connection means between each of the members and electrical insulation means between the electrical connection means and the outer surfaces of each of the members. The drill string also includes one or more electrical conductors encapsulated by an electrically insulative material. Each electrical conductor is disposed within the hollow passage of each of the members and are electrically connected through the electrical connection means to an electrical conductor of an adjacent member throughout the length of the drill string. The system also includes an electronic transmitter disposed within the drill head, the transmitter emitting electromagnetic energy. The system also includes an electronic receiver disposed above ground, the electronic receiver receiving the electromagnetic energy.

Another aspect of the invention relates to a drill head that forms a portion of a drill sting for boring a hole through the ground. The drill head includes a member having a generally longitudinally extending housing including an outer surface, an inner surface defining a first hollow passage therethrough. The housing further defining a chamber, a first end adapted and configured for boring through the ground and a second end adapted and configured to be coupled to any one of a starter rod and a drill stem. An electrically insulative ring radially disposed about said second end, and one or more second hollow passages defined through said member, said one or more second hollow passages forming one or more access tunnels for providing a signal flow path.

Yet another aspect of the invention is a drill pipe that forms a portion of a drill string for boring a hole through the ground. The drill pipe includes a member having a generally longitudinally extending housing including an outer surface, an inner surface defining a first hollow passage therethrough and first and second ends adapted and configured to be coupled to a second drill pipe. An electrically insulative ring radially disposed about said second end, and one or more second hollow passages defined through said member, said one or more second hollow passages forming one or more access tunnels for providing a signal flow path.

Still a further aspect of the invention is a drill string for boring a hole through the ground having a first end adapted and configured to be coupled to a drilling apparatus and a second send adapted and configured for boring a hole through the ground. The drill string includes one or more members having generally longitudinally extending housings, each of said housings including an outer surface and an inner surface defining a hollow passage therethrough and first and second ends adapted and configured to be coupled to any one of a drill head, a drill stem and a starter rod. Electrical insulation means between said members, and one or more second hollow passages defined through said member, said one or more second hollow passages forming one or more access tunnels for providing a signal flow path.

Another aspect of the invention is a method for providing an electrical connection between first and second pipes in a drill string, the pipes including electrical conductors that extend through the pipes, the electrical conductors including electrical contact locations attached to the pipes adjacent the ends of the pipes, the electrical contact locations including a first electrical contact location corresponding to the first pipe and a second electrical contact location corresponding to the second pipe, the first and second electrical contact locations being positioned such that when the first and second pipes are threaded together, the first electrical contact location contacts the second electrical contact location. The method including electrically connecting the electrical conductors of the first and second pipes by threading the first and second pipes together thereby causing the first electrical contact location to be brought into contact with the second electrical contact location.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate various aspects of the invention and together with the description, serve to explain the principles of the invention. These and other features, aspects and advantages of the invention will become better understood with regard to the following description, appended claims and accompanying drawings where:

DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
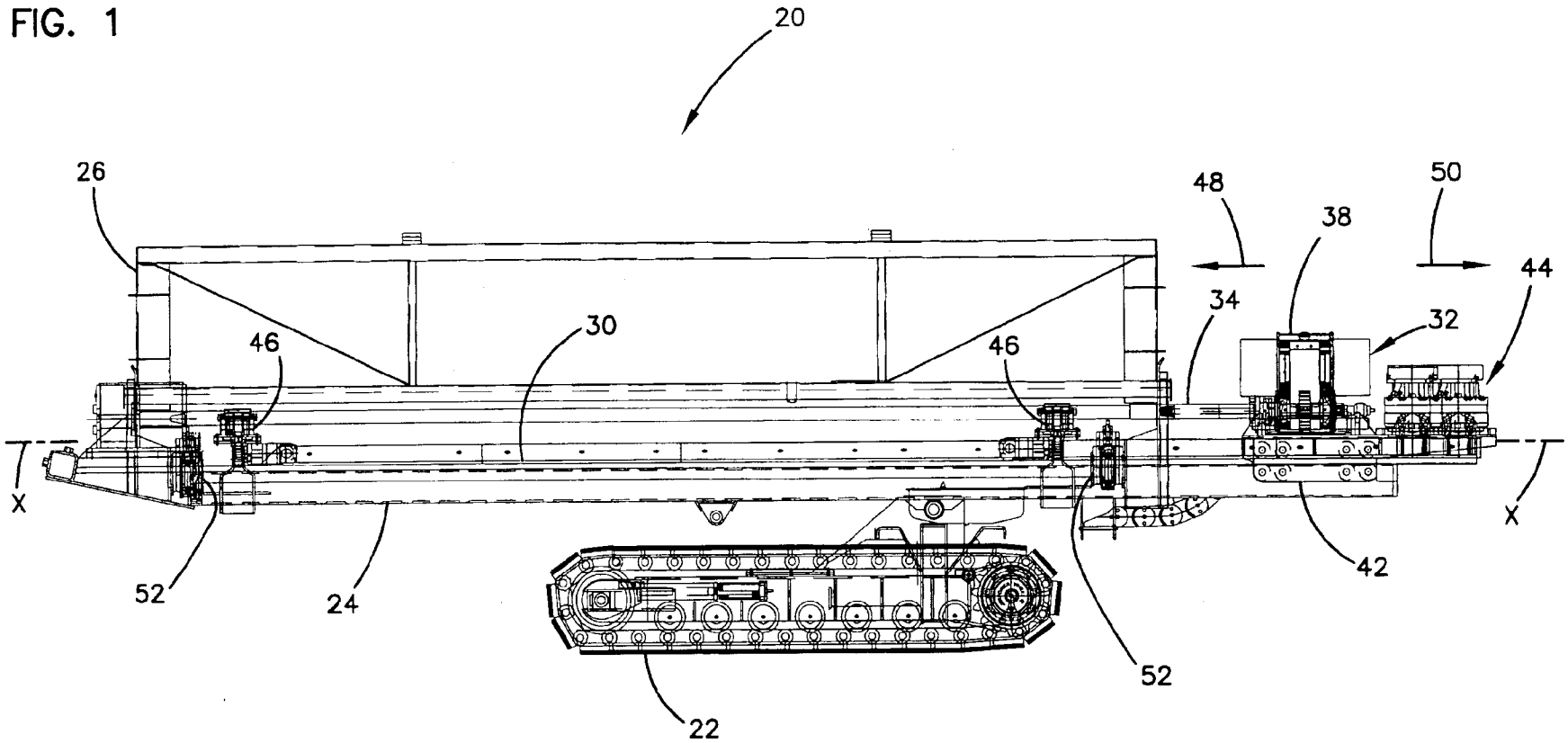
FIG. 1 is a side elevational view of one example of a directional drilling or boring machine constructed in accordance with the principles of the present invention.

FIG. 1 shows one embodiment of a drilling apparatus 20 (e.g., a directional boring machine) constructed in accordance with the principles of the present invention. The drilling apparatus 20 includes a pair of drive tracks 22 (only one shown) for propelling the drilling apparatus 20 along the ground. A frame 24 is pivotally mounted above the drive tracks 22. A magazine 26 for holding one or more drill stems 40, 40' and 40" (FIG. 2) is supported on the frame 24. An elongated track 30 is also supported on the frame 24. A drive head 32 is mounted on a carriage 42 that is coupled to the elongated track 30. The drive head 32 includes a drive member 34 adapted to be coupled to a drill stem (e.g., the drive member 34 includes a threaded end that can be threaded within a drill stem). A drive mechanism 38 is provided for rotating the drive member 34 about a longitudinal drive axis X—X that is generally parallel with respect to the elongated track 30 and a drive mechanism 44 is provided for moving the carriage 42 back and forth along the elongated track 30. A pair of drill stem transfer members 46 are used to convey drill stems between the magazine 26 and the drive head 32.

The drilling apparatus 20 is used to push a drill string 28 (FIG. 2) formed of several drill pipes. The drill string 28 comprises at least one drill stem, a starter rod and a drill head, into the ground to bore a hole. To start the drilling sequence, the frame 24 is pivoted relative to the drive tracks 22 such that the elongated track 30 is inclined relative to the ground (shown generally at FIG. 3). Also, the carriage 42 is moved to a start position as shown in FIG. 1. A first drill stem is then removed from the magazine 26 by the drill stem transfer members 46 and placed in coaxial alignment with the drive axis X—X of the drive head 32. With the drill stem aligned along the drive axis X—X, one end of the drill stem is coupled to the drive member 34 of the drive head 32.

Preferably, a cutting or boring member, e.g., a drill head 36 (FIG. 2), is positioned at the other end of the drill stem. Once the drill stem has been coupled to the drive member 34, the drive mechanism 38 is used to rotate the drill stem about the drive axis X—X. Concurrently, a push stroke is initiated such that the rotating drill stem is drilled into the ground. During the push stroke, the drive mechanism 44 moves the carriage 42 in a direction 48 along the track 30. As is conventionally known in the art, drilling fluids can be used to facilitate drilling operations.

After the push stroke has been completed, the drive member 34 of the drive head 32 is uncoupled from the drill stem and a return/pull stroke is initiated such that the carriage 42 returns to the start position of FIG. 1. During the return/pull stroke, the drive mechanism 44 moves the carriage 42 in a direction 50 along the track 30. With the carriage 42 returned to the start position, a second drill stem is removed from the magazine 26 and placed in coaxial alignment with the drive axis X—X. As so aligned, the second drill stem is coupled to both the drive member 34 and the first drill stem to form a drill string. Thereafter, a push stroke is again initiated such that the entire drill string is pushed further into the ground. By repeating the above steps, additional drill stems can be added to the drill string thereby increasing the length of the hole that is being drilled by the drilling apparatus 20.

Once the hole has been drilled to a desired length, it is common to enlarge the hole through a back reaming process. For example, a back reamer can be attached to the distal end of the drill string. Additionally, product desired to be placed in the hole (e.g., a cable, a duct or the like) can also be connected to the distal end of the drill string. The drill string is then rotated and pulled back toward the drilling apparatus by the drive head 32. For example, the drive head 32 is connected to the drill string and then a return/pull stroke is initiated causing drill string to be pulled in the direction 50. As the drill string is pulled back to the drilling apparatus 20, the back reamer enlarges the previously drilled hole and the product is pulled into the enlarged hole. With each pull/return stroke of the drive head 32, a drill stem is removed from the ground. A conventional scraper (not shown) can be used to remove earth residue from the drill stems as the drill stems are extracted. The extracted drill stems are then uncoupled from the drill string and the drill stem transfer members 46 are used to convey the drill stems back to the magazine 26. Preferably, drill stem lifts 52 are used to push the drill stems from the drill stem transfer members 46 back into the magazine 26.

Figure 2:
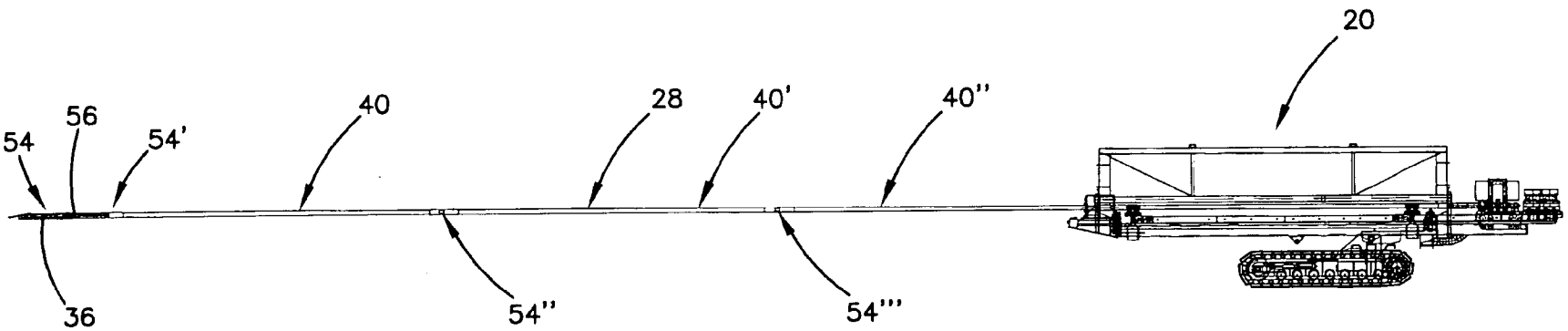
FIG. 2 is a side elevational view of a one example of a directional drilling or boring machine including a drill string constructed in accordance with the principles of the present invention.

FIG. 2 shows one embodiment of the drilling apparatus 20 with the drill string 28 attachment constructed according to the principles of the present invention. The drill string 28 comprises of multiple drill pipes or stems 40, 40', 40" coupled together at several points 54, 54', 54" and 54'" (generally the drill stems are threaded together), a starter rod 56 and a drill head 36. An important aspect of the present invention relates to providing electrical power from the drilling apparatus 20 located above ground to a sonde 58 (FIG. 4) located within the drill head 36 below ground, and providing electrical signals to and from the sonde and the drilling apparatus 20. In one embodiment, the present invention provides electrical connections through the drill stems 40, 40' and 40" as they are mechanically coupled to each other, to the starter rod 56 and to the drill head 36. Means for making an electrical contact at the mechanical coupling points 54, 54', 54" and 54'" are provided between these members. During the mechanical coupling process the contacts at the coupling points 54, 54', 54" and 54'" make an electrical connection with an electrical conductor disposed within the drill stems 40, 40' and 40", the starter rod 56 and the drill head 36.

Figure 3:
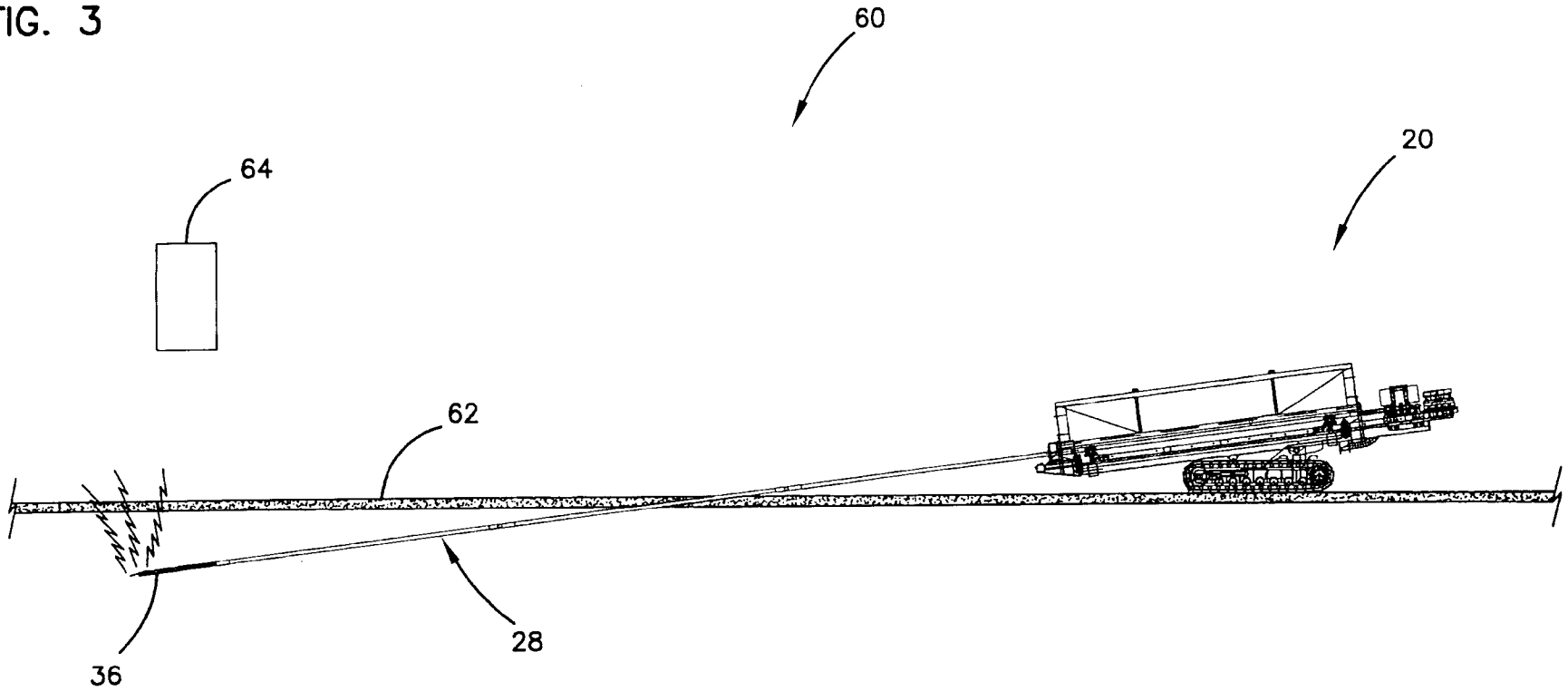
FIG. 3 illustrates one example of a system for locating a drill head located below the ground from a location above the ground.

FIG. 3 shows a system 60 constructed according to the principles of the present invention for locating the drill head 36 located at a distal end of the drill string 28 which is located below the ground 62. The position of the drill head 36 is located using a radio receiver 64 from a location above the ground 62. The radio receiver 64 detects electromagnetic energy at radio frequencies emitted by the sonde 58 (FIG. 4) located within the drill head 36. One advantage of the present invention is that electrical power is supplied to the sonde via an electrical conductor disposed within a hollow passage inside the drill string 28. Thus providing as much electrical power as may be required to generate an electromagnetic signal to be detected above the ground 62. This feature allows the sonde 58 to emit a stronger electromagnetic signal. This is desirable if there is excessive attenuation of the signal at a point above the ground 62.

Figure 4:
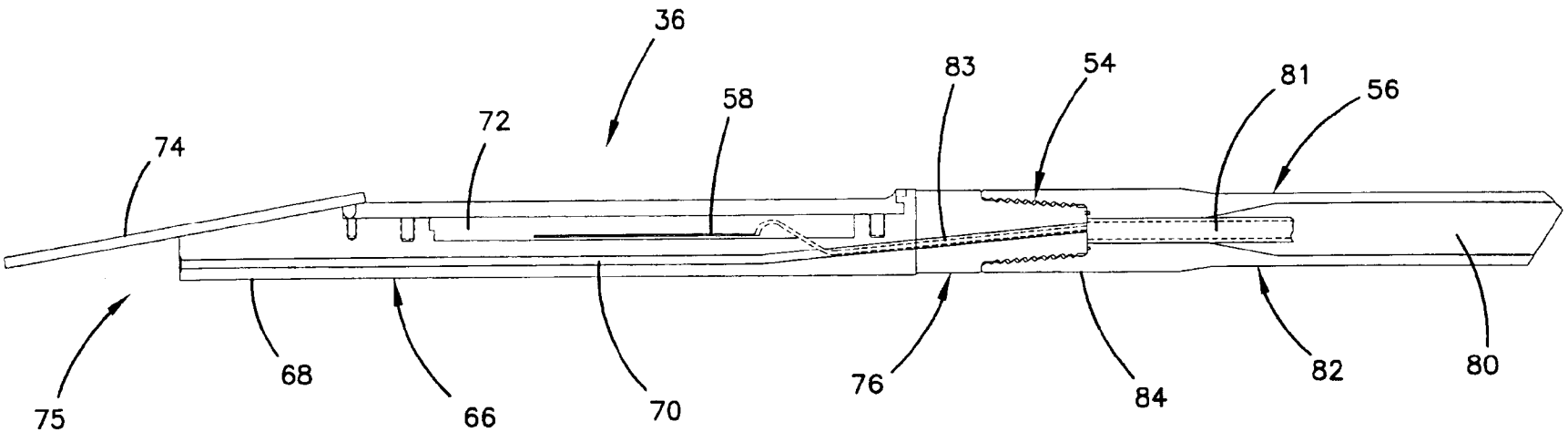
FIG. 4 is a longitudinal cross-sectional view of one example of a drill head and starter rod.

FIG. 4 shows one embodiment of a longitudinal cross sectional view of the drill head 36 and the starter rod 56 forming a portion of the drill string 28, constructed according to the principles of the present invention. The drill head 36 includes a generally longitudinally extending housing 66 including an outer surface 68 and an inner surface defining a hollow passage 70. The hollow passage 70 is generally used to pass drilling fluids to facilitate the drilling process. The housing 66 also includes a chamber 72 for placing a sonde 58 therein. The drill head 36 includes a first end 75 adapted and configured with a drilling or boring member 74. The drill head 36 includes a second end 76 adapted and configured to be coupled to a starter rod 56 at mechanical coupling point 54. The second end 76 of the drill head 36 is a male threaded end that couples into a female threaded end of the starter rod 56. It will be appreciated that the coupling ends may be male or female threaded ends depending on the configuration of the invention.

The starter rod 56, constructed according to the principles of the present invention, also includes a generally longitudinally extending housing 82 including an outer surface 84 and an inner surface defining a hollow passage 80. As is conventionally known in the art, drilling fluids are passed through the hollow passage 80 to facilitate the drilling process. The starter rod 56 includes a first female threaded end to couple with the drill head 36 at coupling point 54. The starter rod 56 also includes a female threaded end adapted and configured for coupling to the drill stem 40 at connection point 54'.

Whenever the starter rod 56 is mechanically coupled to the drill head 36, means disposed at each corresponding mechanical coupling ends form an electrical connection between a segment of electrical conductor 81 disposed within the hollow passage 80 of the starter rod 56, and a segment of electrical conductor 83 disposed within the hollow passage 70 of the drill head 36. The segment of electrical conductor 83 disposed within the drill head 36 terminates at the sonde 58 for supplying power thereto and for carrying signals therefrom and thereto. Also, an electrical conductor segment (not shown) disposed within the drill stem 40 is electrically coupled to the electrical conductor 81 segment disposed within the hollow passage 80 of the starter rod 56, whenever the drill stem 40 is mechanically coupled to the starter rod 56. An electrical contact point similar to electrical contact point 102 (described in detail in the description of FIG. 5 below) is formed between the starter rod 56 and the drill head 36 to provide an electrical connection between the conductor segments 81, 83 disposed within the starter rod 56 and the drill head 36, respectively.

Figure 5:
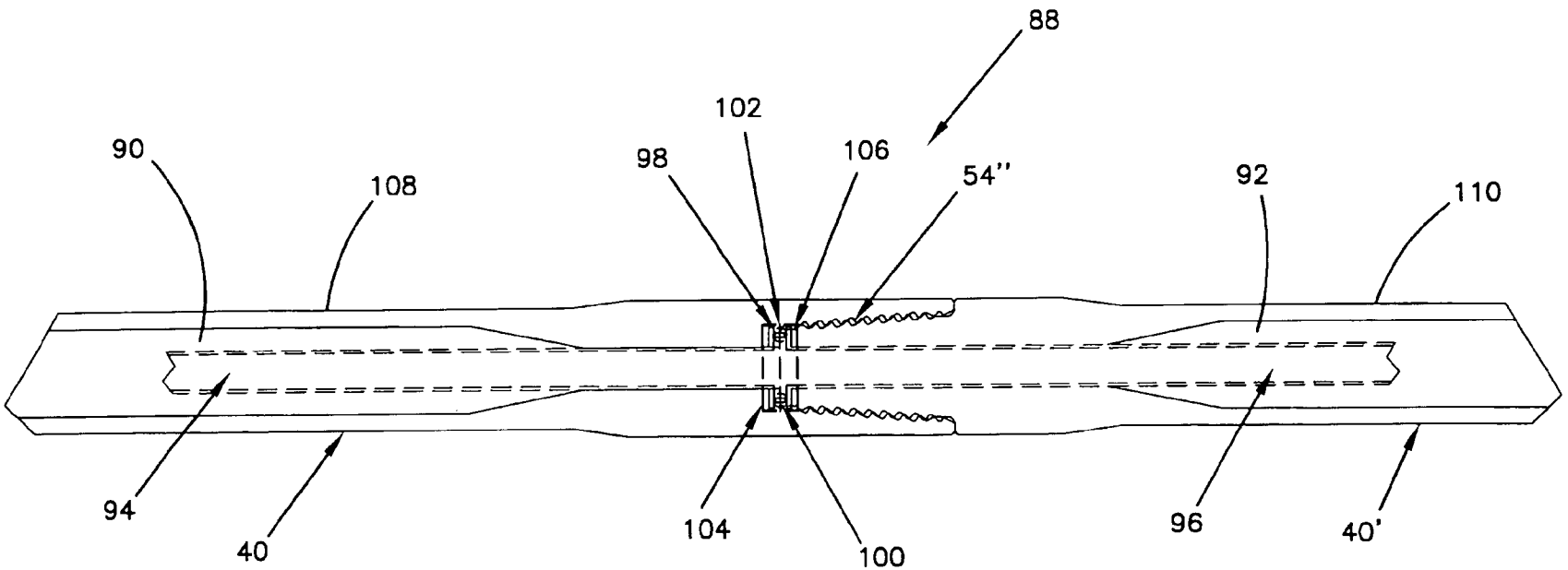
FIG. 5 is a longitudinal cross-sectional view of one example of mechanically coupled drill stems.

FIG. 5 shows generally at 88 a longitudinal cross sectional view of portions of drill stems 40 and 40' mechanically coupled at mechanical coupling point 54". Drill stems 40 and 40' include outer surfaces 108 and 110, respectively, and inner surfaces defining hollow passages 90 and 92, respectively. The first drill stem 40 includes a segment of electrical conductor 94 that is encapsulated in an electrically insulative material. Likewise, the second drill stem 40' also includes a segment of electrical conductor 96 that is encapsulated in an electrically insulative material. The first drill stem 40 includes a conductive ring 98 disposed at one end. Adjacent to the conductive ring 98, the first drill stem 40 also includes an insulative (non-electrically-conductive) ring 104. The second drill stem 40' also includes a conductive ring 100, and an insulative ring 106 disposed adjacently to the conductive ring 100.

The electrical conductor segments 94, 96 are cylindrical (e.g., tubular) in shape for allowing drilling fluids to pass through each conductor segments. The conductor segments are formed with end flanges that project radially outward to provide a piercing location. Those skilled in the art will appreciate that the conductor segments should not be limited to a cylindrical tubular shape and may be provided in various embodiments as long as the functionality of passing drilling fluids between the first and second drill stems 40, 40', respectively, is preserved. For example, one or more electrical conductor segments may be provided whereby each conductor segment is formed with a flange that projects radially outward to provide a piercing location.

When the second drill stem 40' is mechanically coupled to the first drill stem 40 at mechanical coupling point 54" an electrical contact point 102 is formed between the conductive rings 98 and 100. As the second drill stem 40' is coupled to the first drill stem 40, the conductive ring 98 forms an electrical contact with the electrical conductor segment 94 disposed within the hollow passage 90. Likewise, the conductive ring 100 forms an electrical contact with the electrical conductor segment 96. Accordingly, a continuous electrical connection is formed between the newly added second drill stem 40' through the electrically conductive coupling point 102 and mechanical coupling point 54" to the portion of the drill sting 28 formed by the drill stem 40, the starter rod 56 and the drill head 36. The electrically insulative rings 104 and 106 electrically isolate the conductive rings 98 and 100, respectively, from the other surfaces 108 and 110, respectively, of the drill stems 40, 40', respectively. The electrically insulative material encapsulating the electrical conductors 94, 96 electrically isolate the electrical conductor segments 94 and 96, from the outer surfaces 108, 110, respectively.

It will be appreciated by those skilled in the art that the conductive rings 98, 100 may be formed of copper and the electrically insulative rings 104, 106 may be formed of a polymer material. The insulative rings 104, 106 may also be formed of polyurethane, ceramic or other suitable electrically insulative materials that are generally well known in the art, without departing from the principles of the present invention. Furthermore, it will be appreciated that since insulative rings 104, 106 may be constructed of various polymers or polyurethanes, they will be compressed during the mechanical coupling process of the drill stems 40, 40' so as to ensure good electrical engagement between the conductive rings 98, 100 and the electrical conductor segments 94, 96, respectively.

Figure 6:
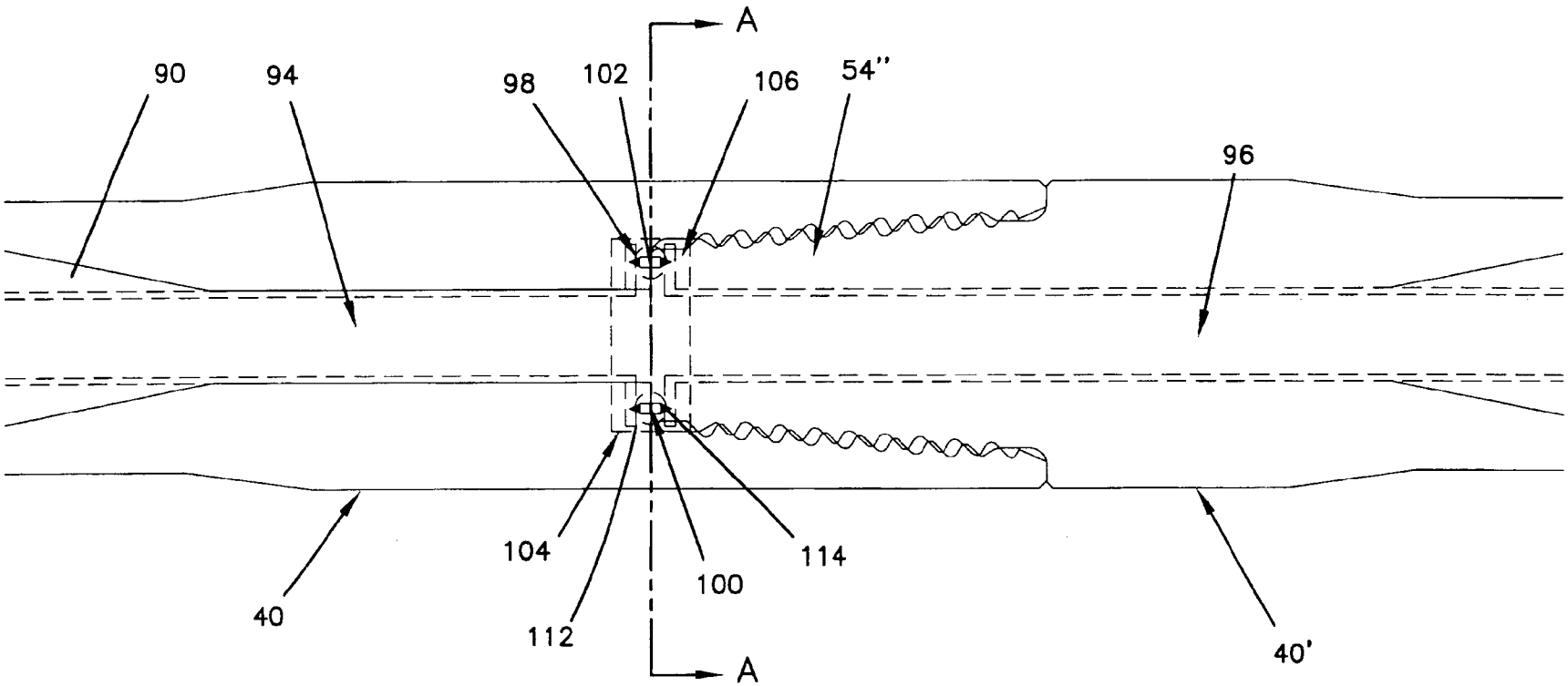
FIG. 6 is a longitudinal cross-sectional view of one example of mechanically coupled drill stems.

FIG. 6 shows a detailed longitudinal cross sectional view of the portions of the drill stems 40, 40' that are mechanically coupled at mechanical coupling point 54". Other drill stems forming the drill string 28 are coupled in a similar fashion. Means for electrically coupling the conductive rings to the electrical conductor segments 94, 96 are provided on a rear portion of the conductive rings 98, 100, respectively, that faces inwardly toward the center of the drill stem 40, 40', respectively. For example, in one embodiment, means 112, 114 for piercing the electrically insulative material encapsulating the electrical conductor segments 94, 96 are provided on the rear portion of the conductive rings 98, 100, respectively. It will be appreciated that other means may be provided for electrically coupling the conductive rings 98, 100 to the electrical conductor segments 94, 96, respectively, without departing from the principles of the invention.

In one embodiment, as the drill stems 40 and 40' are mechanically coupled, the rear portions of conductive rings 98, 100, forming surfaces 112, 114, respectively, pierce through the insulative material encapsulating the electrical conductive segments 94, 96, respectively. Thus, forming an electrically conductive coupling with the electrical conductor segments 94 and 96 through electrical coupling point 102. Accordingly, the conductive rings 98, 100 are then electrically coupled to the electrical conductor segments 94, 96, respectively.

Figure 7A:
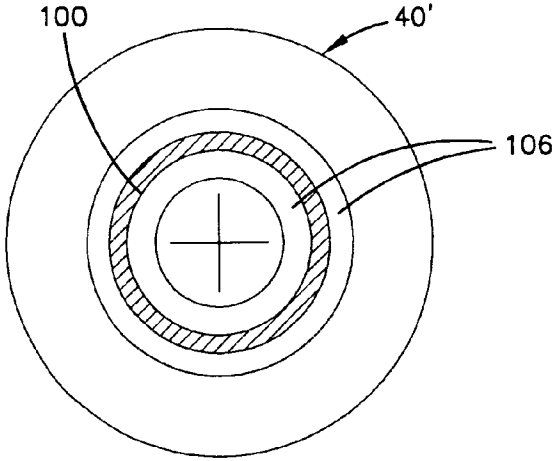
FIGS. 7A–C are cross-sectional end view of several examples of drill stems.

FIG. 7A is a cross sectional view of the drill stem 40' taken along section A—A (FIG. 6). The conductive ring 100 is disposed at one end of the drill stem 40' with an insulative ring 106 disposed adjacent and to the rear of the conductive ring 100.

Figure 7B:
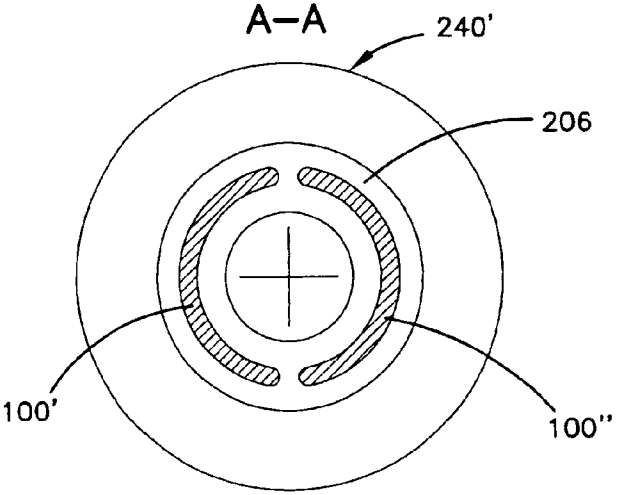

As illustrated in FIG. 7B, in one embodiment, a drill stem 240' includes conductive rings formed as ring portions 100', 100", electrically insulated from each other. The conductive half rings 100', 100" are disposed at one end of the drill stem 240' with an insulative ring 206 disposed adjacent and to the rear of the conductive ring portions 100', 100". Each ring portion 100', 100" providing a conductive path from an electrical conductor segment in one drill stem to another electrical conductor segment in an adjacent drill stem, as described above. Accordingly, once the two drill stems are coupled, two separate continuous electrical connections may be formed between the drill stems forming a drill string. It will be appreciated that one or more conductive ring segments may be provided in a similar fashion for providing one or more continuous conductive paths along the drill string 28 from a point above the ground 62 to the drill head 36.

Figure 8B:
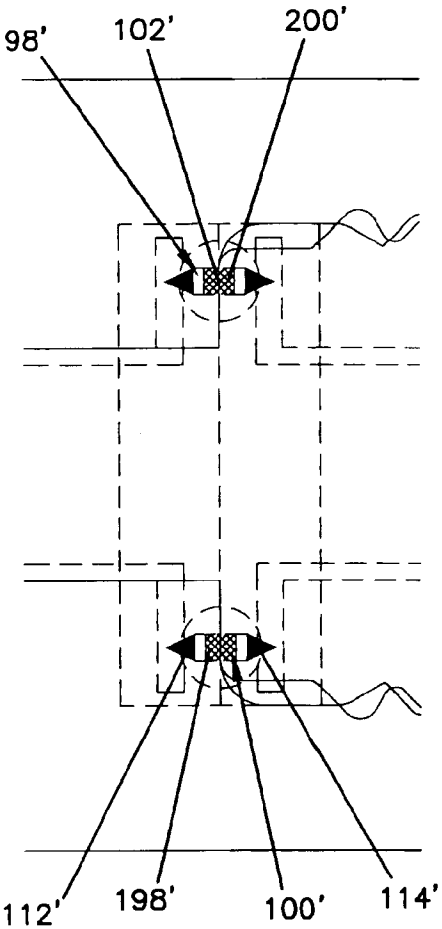
FIGS. 8A–B is a longitudinal cross-sectional view of one example of mechanically coupled drill stems.
Figure 8A:
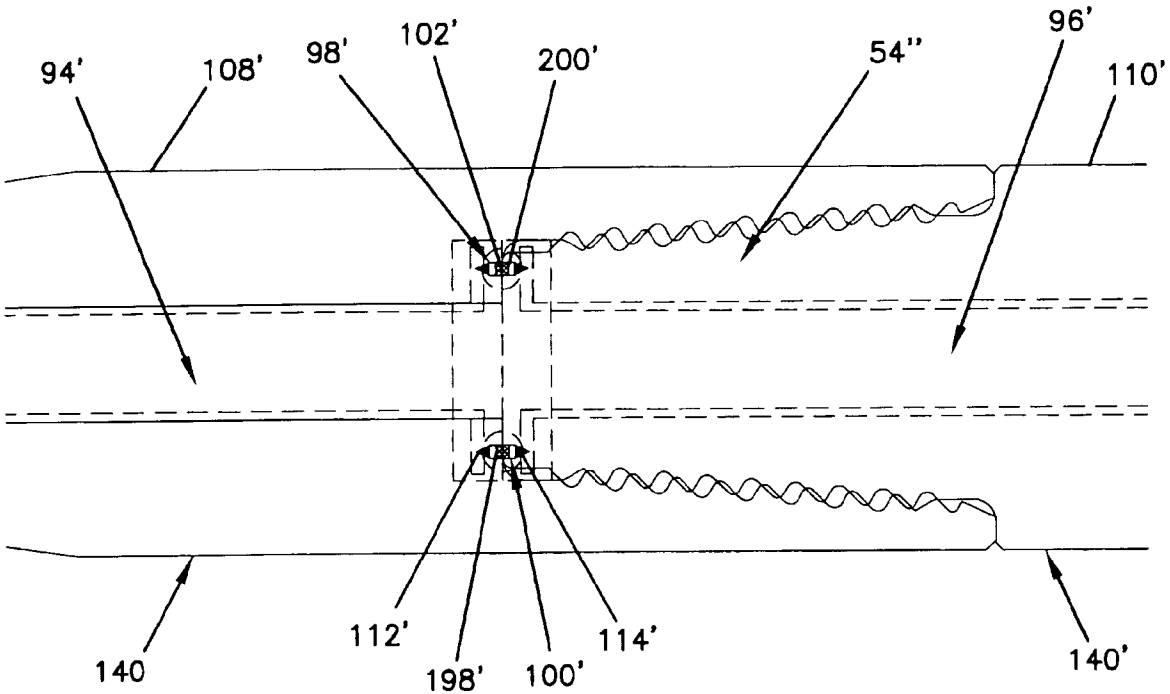

FIG. 8A illustrates one embodiment of the invention where conductive rings 98' and 100' are provided with an electrically insulative coating 198', 200'. The electrically insulative coating 198', 200' functions such that contact point 102' will no longer be an electrically conductive connection between the rings 98' and 100'. Rather, the electrically insulative coatings 198' and 200' will electrically isolate the conductive rings 98', 100' from each other. Thus, this configuration forms a capacitive coupling between the conductive rings 98' and 100'. Accordingly, the electrical conductor segments 94' and 96' will be capacitively coupled to each other rather than being electrically conductively coupled. However, as described above, each ring 98', 100' provides an electrical connection between itself and a corresponding electrical conductor segment 94' and 96', respectively, disposed within drill stems 140, 140', respectively. For example, means 112', 114' for piercing the electrically insulative material encapsulating the electrical conductor segments 94', 96' may be utilized.

FIG. 8B is a detailed illustration of the capacitive coupling connection at 102', showing electrically the insulative coating 198' on conductive ring 98' and the electrically insulative coating 200' on conductive ring 100'.

In one embodiment, one conductor may be used for capacitively coupling electrical signals between adjacent drill segments 140, 140' through the capacitive coupling joint formed at the coupling point 102'. In this configuration, the exterior portions 108' and 110' of drill segments 140, 140', respectively, provide a return path for an electrical signal that is capacitively coupled along the length of the drill stem. In another embodiment, two conductors may be used. One conductor for providing a signal path and the other conductor for providing a return path.

Figure 9:
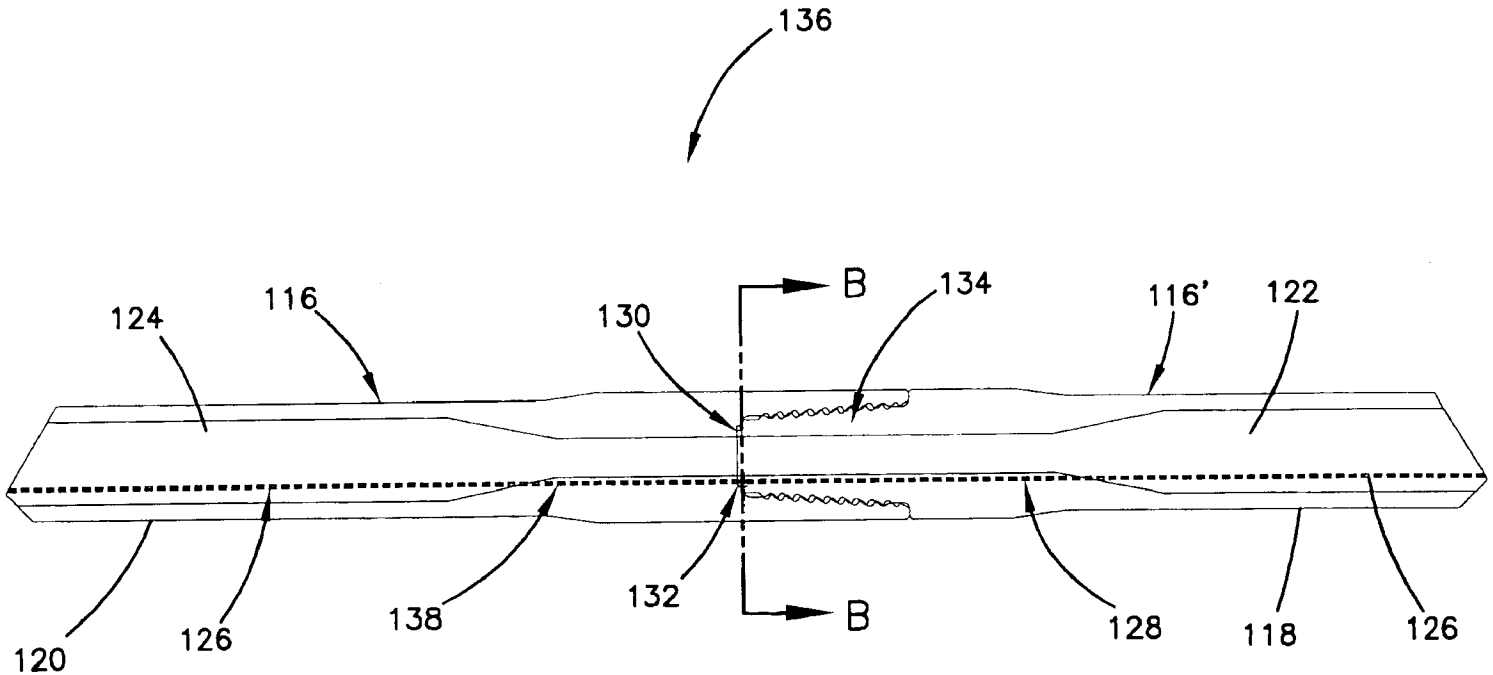
FIG. 9 is a longitudinal cross-sectional view of one example of mechanically coupled drill stems.

FIG. 9 shows generally at 136 a longitudinal cross sectional view of portions of drill stems 116 and 116' mechanically coupled at mechanical coupling point 134. Drill stems 116 and 116' include outer surfaces 120 and 118, respectively, and inner surfaces defining first hollow passages 124 and 122, respectively. Each drill stem 116, 116' further includes second hollow passages 138 and 128, respectively, forming access tunnels for feeding means for providing a signal flow path therethrough (e.g. an electrical conductor cable, fiber optic cable, acoustic conduit, and the like).

It will be appreciated that as drill stems are added, a continuous signal flow path is formed between the drill head 36 and to a point above the ground (e.g. the drilling apparatus 20). It will also be appreciated that other cables or conduits capable of providing an electrical power, and/or a signal flow path between the drill head 36 and a point above ground may be provided through the second hollow passages 138, 128. For example, a fiber optic cable may be disposed within the second passages 138, 128 for providing a signal flow path capable of transferring pulses of light therethrough.

As shown in FIG. 9, electrical conductor 126, encapsulated in an electrically insulative material, is disposed within the second passage 138 in drill segment 116. Likewise, the electrical conductor 126 is disposed within the second passage 128 in drill segment 116'. Electrical power and/or signals may be transmitted by the electrical conductor 126 from a point above the ground (e.g. the drilling apparatus) to the sonde 58 (or other electronic device) located within a drill head below the ground. To provide electrical isolation between the drill stems 116, 116', an insulated contact ring 130 is disposed between the drill stems 116, 116'. It will be appreciated that the drill segments 116 and 116' may be provided with one or more hollow passages for providing one or more signal paths between the sonde 58 and a point above ground.

Electrical conductor segment 126 should not be limited to a single conductor segment passing through the drill stems 116 and 116'. For example, separate conductor segments may be utilized without departing from the principles of the invention. Accordingly, if separate conductor segments are provided within the drill stems 116 and 166' an electrical contact point similar to electrical contact point 102 (described in detail in the description of FIG. 5 above) may be provided between drill stems 116 and 116' thus providing an electrical connection between the separate conductor segments disposed therein.

Figure 7C:
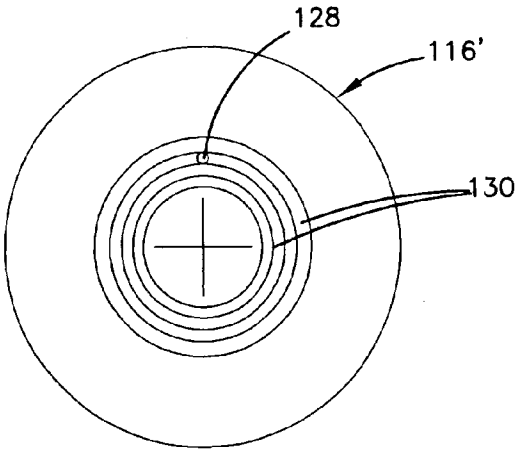

FIG. 7C shows a cross sectional view of the drill stem 116' taken along section B—B (FIG. 9). In one embodiment, a single hollow passage 128 is provided in the drill stem 116'. Insulative ring 130 being disposed on a distal end of the drill stem.

Figure 7D:
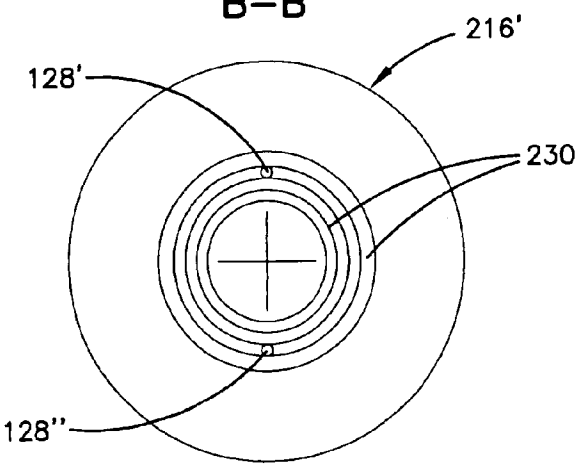

FIG. 7D is a cross sectional view of the drill stem 216' provided with two hollow passages 128', 128" within a drill stem 216'. As describe above, an electrically insulative ring 230 is disposed on a distal end of the drill stem 216'.

Figure 10:
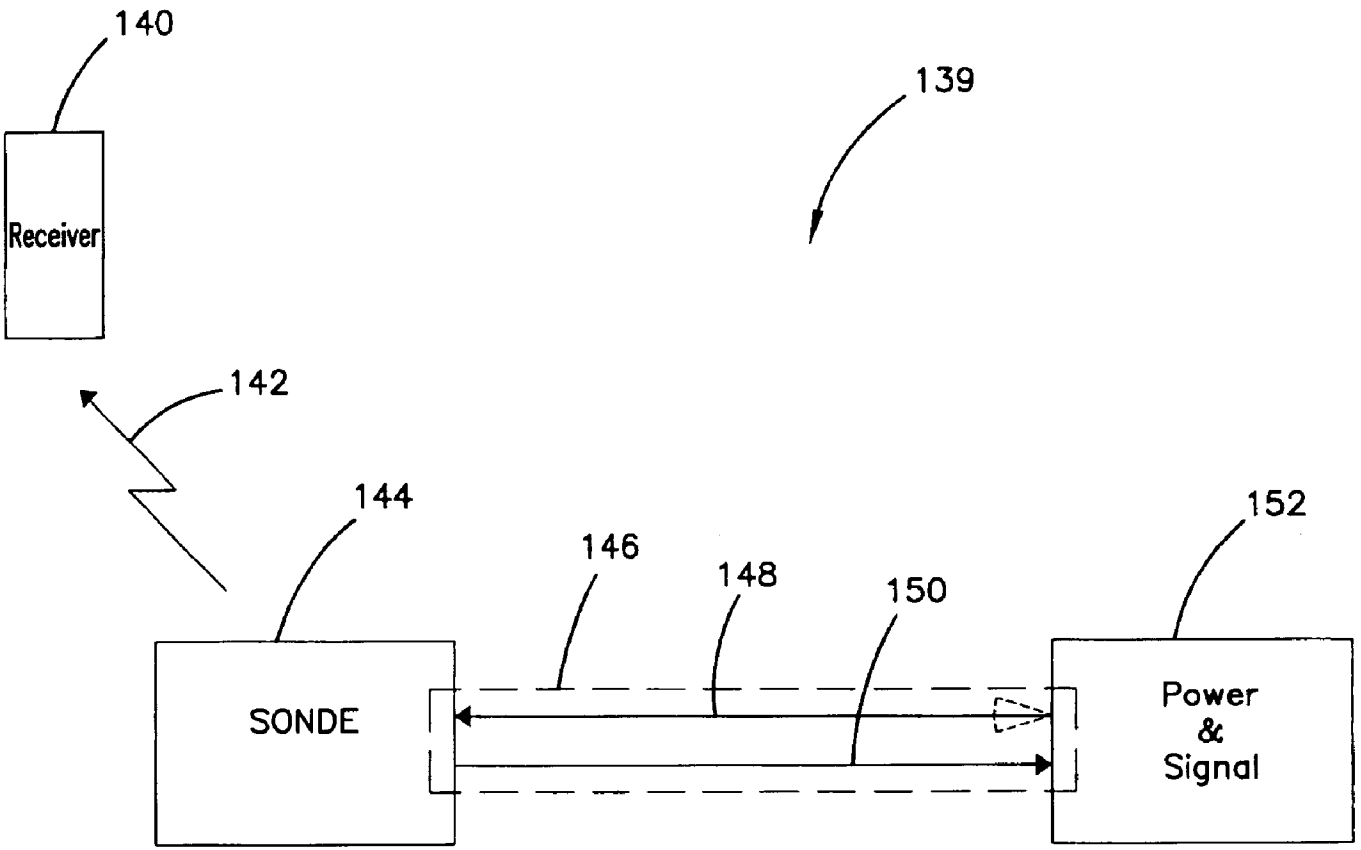
FIG. 10 is functional block diagram of a system for locating a drill head.

FIG. 10 illustrates a functional block diagram of a system 139 for determining the position of a sonde 144 that is located underground. In one embodiment electrical power and signals may be provided to and from the sonde 144 and a power/signal source 152 via power/signal paths 146, 150. It will be appreciated that both power and signals may be provided along a single path. In one embodiment, electrical power may be provided to the sonde 144 from the power/signal source 152. The sonde 144 may propagate electromagnetic energy 142 to be detected above ground using radio frequency receiver 140.

It is to be understood that the present invention is not limited to the particular construction and arrangement of parts disclosed and illustrated herein, but embraces all such modified forms thereof as come within the scope of the following claims.

The claimed invention is:

1. A drill head forming a portion of a drill string for boring a hole through the ground, comprising:

a member having a generally longitudinally extending housing including an outer surface, an inner surface defining a hollow passage therethrough, said housing further defining a chamber, a first end adapted and configured for boring through the ground and a second end adapted and configured to be coupled to any one of a starter rod and a drill stem;

an electrically insulative ring radially disposed about said second end an electrically conductive ring radially disposed within said electrically insulative ring;

an electrically conductive piercing means located about said electrically insulative ring, said piercing means for piercing through said electrically insulative ring to establish electrical continuity with said electrically conductive ring beyond said electrically insulative ring in response to pressure applied to said electrically conductive piercing means;

an electrical conductor encapsulated by an electrically insulative material, said electrical conductor disposed within said hollow passage and being electrically connectable between said conductive ring and an electronic device disposed within said chamber, said electrically insulative ring providing electrical isolation between said conductive ring and said outer surface of said drill head and between said piercing means and said electrical conductor when no pressure is applied to said piercing means, and said electrically insulative material providing electrical isolation between said electrical conductor and said inner surface of said hollow passage.

2. A drill head according to claim 1, further comprising an electronic device disposed within said chamber.

3. A drill head according to claim 2, wherein said electronic device is a sonde.

4. A drill head according to claim 1, wherein said electrically conductive ring is formed from a copper material.

5. A drill head according to claim 1, wherein said electrically insulative ring is formed from a polymer material.

6. A drill head according to claim 5, wherein said polymer ring is a polyurethane material.

7. A drill head according to claim 1, wherein said electrically insulative ring is formed from a ceramic material.

8. A drill head according to claim 1, wherein said electrically insulative material encapsulating said electrical conductor is formed from a polymer material.

9. A drill head according to claim 8, wherein said polymer material encapsulating said electrical conductor is a polyurethane material.

10. A drill head according to claim 1, wherein said electrically insulative material encapsulating said electrical conductor is formed from a ceramic material.

11. A drill head according to claim 1, wherein said generally longitudinally extending housing further comprises a second hollow passage therethrough forming an access tunnel.

12. A drill head according to claim 11, wherein said electrical conductor encapsulated by said electrically insulative material, is disposed within said second hollow passage.

13. A drill pipe forming a portion of a drill string for boring a hole through the ground, comprising:

a member having a generally longitudinally extending housing including an outer surface, an inner surface defining a hollow passage therethrough and first and second ends adapted and configured to be coupled to a second member;

first and second electrically conductive rings radially disposed about first and second distal ends of said member, the first and second rings have two or more isolated segments;

first and second electrically insulative rings radially disposed about said first and second ends and proximate to said first and second electrically conductive rings; and a first and second electrical conductor encapsulated by an electrically insulative material, said first and second electrical conductor disposed within said hollow passage and said first electrical conductor being electrically connectable between one of the two or more isolated segments of said first and second conductive rings and said second electrical conductor being electrically connectable between one of the two or more isolated segments of said first and second conductive rings not connected to the first electrical conductor, and said first and second electrically insulative rings providing electrical isolation between said first and second conductive rings and said outer surface of said drill pipe, and said electrically insulative material providing electrical isolation between said electrical conductor and said inner surface of said hollow passage.

14. A drill pipe according to claim 13, wherein said member is a starter rod.

15. A drill pipe according to claim 14, wherein said second member is any one of a drill head and drill stem.

16. A drill pipe according to claim 13, wherein said member is a drill stem.

17. A drill pipe according to claim 16, wherein said second member is any one of a drill head, a drill stem and a starter rod.

18. A starter rod according to claim 13, wherein said electrically conductive ring is formed from a copper material.

19. A starter rod according to claim 13, wherein said electrically insulative ring is formed from a polymer material.

20. A starter rod according to claim 19, wherein said polymer is a polyurethane material.

21. A starter rod according to claim 13, wherein said electrically insulative ring is formed from a ceramic material.

22. A starter rod according to claim 13, wherein said electrically insulative material encapsulating said electrical conductor is made from a polymer material.

23. A starter rod according to claim 22, wherein said polymer material encapsulating said electrical conductor is a polyurethane material.

24. A starter rod according to claim 13, wherein said electrically insulative material encapsulating said electrical conductor is formed from a ceramic material.

25. A starter rod according to claim 13, wherein said electrically conductive ring further comprises means for piercing said insulative material and electrically connecting said conductive ring to said electrical conductor.

26. A starter rod according to claim 13, wherein said generally longitudinally extending housing further comprises a second hollow passage therethrough forming an access tunnel.

27. A starter rod according to claim 26, wherein said electrical conductor encapsulated by said electrically insulative material, is disposed within said second hollow passage.

28. A drill string for boring a hole through the ground having a first end adapted and configured to be coupled to a drilling apparatus and a second end adapted and configured for boring a hole through the ground, comprising:

one or more members having generally longitudinally extending housings, each of said housings including an outer surface and an inner surface defining a hollow passage therethrough and first and second ends adapted and configured to be coupled to any one of a drill head, a drill stem and a starter rod;

electrical connection means between each of said members, electrical connection means including a conductive ring on each of said members separated from a conductive ring of an adjacent member by an insulator thereby establishing a capacitance between the conductive ring of each of said members and an adjacent member;

electrical insulation means between said electrical connection means and said outer surfaces of each of said members; and one or more electrical conductors encapsulated by an electrically insulative material, each electrical conductor being disposed within each of said hollow passages of each of said members and being capacitively connected through said electrical connection means to an electrical conductor of an adjacent member throughout the length of said drill string.

29. A drill string according to claim 28, wherein said electrical connection means are electrically conductive rings.

30. A drill string according to claim 29, wherein said electronically conductive rings are formed from a copper material.

31. A drill string according to claim 28, wherein said electrical insulative means are electrically insulative rings.

32. A drill string according to claim 31, wherein said electrically insulative rings are formed from a polymer material.

33. A drill string according to claim 32, wherein said polymer is a polyurethane material.

34. A drill string according to claim 31, wherein said electrically insulative rings are formed from a ceramic material.

35. A drill string according to claim 28, wherein said electrically insulative material encapsulating said electrical conductor is formed from a polymer material.

36. A drill string according to claim 35, wherein said polymer material encapsulating said electrical conductor is a polyurethane material.

37. A drill string according to claim 28, wherein said electrically insulative material encapsulating said electrical conductor is formed from a ceramic material.

38. A drill string according to claim 28, wherein said electrical connection means further comprises means for piercing said insulative material and electrically connecting said conductive ring to said electrical conductor.

39. A drill string according to claim 28, wherein said generally longitudinally extending housing further comprises a second hollow passage therethrough forming an access tunnel.

40. A drill string according to claim 39, wherein said electrical conductor encapsulated by said electrically insulative material, is disposed within said second hollow passage.

41. A drilling apparatus for boring a hole through the ground, comprising:

a frame having a longitudinal axis extending from a first frame end to a second frame end;

a drill string having a first end adapted and configured to be coupled to a drilling apparatus and a second end adapted and configured for boring a hole through the ground, said drill string further comprising one or more adjacently disposed members including electrical connection means disposed therebetween and providing electrical continuity between said members, said electrical connection means including an electrical ring having two or more isolated segments disposed within an electrical insulator and a piercing means, the piercing means for piercing through the electrical insulator to establish electrical continuity with at least one of the two or more isolated segments beyond the electrical insulator in response to pressure applied to the piercing means;

a drive mechanism mounted on said frame for movement along said axis, said drill string being connected to said drive mechanism for said drive mechanism to rotate said drill string and to longitudinally advance and retract said drill string in response to said drive mechanism moving along said axis; and means for providing electrical continuity between said first and second ends of said drill string.

42. A drilling apparatus according to claim 41, wherein said means for providing electrical continuity further comprises:

one or more members having generally longitudinally extending housings, each of said housings including an outer surface and an inner surface defining a hollow passage therethrough and first and second ends adapted and configured to be coupled to any one of a drill head, a drill stem and a starter rod;

electrical connection means between ends of each said members;

electrical insulation means between said electrical connections and said outer surfaces of each said members; and one or more electrical conductors encapsulated by an electrically insulative material, each electrical conductor being disposed within said hollow passage of each of said members and being electrically connected through said electrical connection means to an electrical conductor of an adjacent member throughout the length of said drill string.

43. A drill string according to claim 42, wherein said electrical connection means are electrically conductive rings.

44. A drilling apparatus according to claim 42, wherein said electrically conductive rings are formed from a copper material.

45. A drill string according to claim 42, wherein said electrical insulation means are electrically insulative rings.

46. A drilling apparatus according to claim 42, wherein said electrically insulative rings are formed from a polymer material.

47. A drilling apparatus according to claim 46, wherein said polymer is a polyurethane material.

48. A drilling apparatus according to claim 43, wherein said electrically insulative rings are formed from a ceramic material.

49. A drilling apparatus according to claim 42, wherein said electrically insulative material encapsulating said electrical conductor is formed from a polymer material.

50. A drilling apparatus according to claim 49, wherein said polymer material encapsulating said electrical conductor is formed from a polyurethane material.

51. A drilling apparatus according to claim 42, wherein said electrically insulative material encapsulating said electrical conductor is formed from a ceramic material.

52. A drilling apparatus according to claim 42, wherein said generally longitudinally extending housing further comprises a second hollow passage therethrough forming an access tunnel.

53. A drilling apparatus according to claim 52, wherein said electrical conductor encapsulated by said electrically insulative material, is disposed within said second hollow passage.

54. A drilling apparatus for boring a hole through the ground, comprising:

a frame having a longitudinal axis extending from a first frame end to a second frame end;

a drill string having a first end adapted and configured to be coupled to a drilling apparatus and a second end adapted and configured for boring a hole through the ground, and said drill string further comprising one or more adjacently disposed members and signal flow path connection means disposed therebetween providing signal continuity between said members, said signal flow path connection means including a first electrically conductive ring having two or more isolated segments disposed within an electrically insulative ring, said electrically insulative ring separating said two or more isolated segments of said first electrically conductive ring of one member from an electrically conductive ring having two or more isolated segments of an adjacent member to create a capacitance between said two or more isolated segments of said first electrically conductive ring of one member and said two or more isolated segments of said electrically conductive ring of the adjacent member;

a drive mechanism mounted on said frame form movement along said axis, said drill string being connected to said drive mechanism for said drive mechanism to rotate said drill string and to longitudinally advance and retract said drill string in response to said drive mechanism moving along said axis;

one or more signal flow path means disposed within said drill string, said signal flow path means providing signal continuity between first and second ends of each member and said first and second ends of said drill string.

55. A method of providing an electrical connection throughout the length of a drill string, said drill string including one or more members having generally longitudinally extending housings, each of said members including an outer surface and an inner surface defining a hollow passage therethrough and first and second ends adapted and configured to be coupled to any one of a drill head, a drill stem and a starter rod, electrical connection means including a first electrically conductive ring and an electrically conductive piercing means between ends of each of said members, electrical insulation means enclosing said first electrically conductive ring of said electrical connection means, and one or more electrical conductors encapsulated by an electrically insulative material, each electrical conductor being disposed within said hollow passage of each of said members and being electrically connected through said electrical connection means to an electrical conductor of an adjacent member throughout the length of said drill string, the method comprising:

moving a first member into coaxial alignment with a drill axis;

coupling a second member to said first member; and engaging said electrical connection means between adjacent ends of said members while coupling said first member to said second member to apply pressure to said piercing means causing said piercing means to pierce said electrical insulation means and establish electrical continuity with said first electrically conductive ring beyond said electrical insulation means.

56. A system for locating a drill head located below the ground from a location above the ground, comprising:

a drilling apparatus;

a drill string arranged and configured to be coupled to said drilling apparatus at one end and coupled to a drill head at anther end, said drill string further comprising two or more members having generally longitudinally extending housings, each of said housings including an outer surface and an inner surface defining a hollow passage therethrough and first and second ends adapted and configured to be coupled to any one of a drill head, a drill stein and a starter rod, electrical connection means including a first electrically conductive ring between each of said members, electrical insulation means between said electrical connection means and said outer surfaces of each of said members and one or more electrical conductors encapsulated by an electrically insulative material and between said first electrically conductive ring of a member and an electrically conductive ring of an adjacent member to form a capacitance between the first electrically conductive ring of the member and the electrically conductive ring on the adjacent member, each electrical conductor being disposed within said hollow passage of each of said members and being capacitively connected through said electrical connection means to an electrical conductor of an adjacent member throughout the length of said drill string;

an electronic transmitter disposed within said drill head, said transmitter emitting electromagnetic energy; and an electronic receiver disposed above ground, said electronic receiver receiving said electromagnetic energy.

57. A drill head forming a portion of a drill string for boring a hole through the ground, comprising:

a member having a generally longitudinally extending housing including an outer surface, an inner surface defining a first hollow passage therethrough, said housing further defining a chamber, a first end adapted and configured for boring through the ground and a second end adapted and configured to be coupled to any one of a starter rod and a drill stem;

an electrically insulative ring radially disposed about said second end;

an electrically conductive ring having two or more isolated segments disposed about the electrically conductive ring;

one or more second hollow passages defined through said member, said one or more second hollow passages forming one or more access tunnels for providing a signal flow path; and two or more electrical conductors disposed within the one or more second hollow passages and electrically connected to the two or more isolated segments of said electrically conductive ring.

58. A drill pipe forming a portion of a drill string for boring a hole through the ground, comprising:

a member having a generally longitudinally extending housing including an outer surface, an inner surface defining a first hollow passage therethrough and first and second ends adapted and configured to be coupled to a second drill pipe;

an electrically insulative ring radially disposed about said second end;

an electrically conductive ring disposed within the electrically insulative ring;

a piercing means deposed about the electrically insulative ring for piercing the electrically insulative ring to establish electrical continuity with the electrically conductive ring beyond the electrically insulative ring in response to pressure applied to the piercing means; and one or more second hollow passages defined through said member, said one or more second hollow passages forming one or more access tunnels for providing a signal flow path to said electrically conductive ring.

59. A drill pipe according to claim 58, wherein said member is a starter rod.

60. A drill pipe according to claim 59, wherein said second member is any one of a drill head and drill stem.

61. A drill pipe according to claim 58, wherein said member is a drill stem.

62. A drill pipe according to claim 61, wherein said second member is any one of a drill head, a starter rod and drill stem.

63. A drill string for boring a hole through the ground having a first end adapted and configured to be coupled to a drilling apparatus and a second end adapted and configured for boring a hole through the ground, comprising:

one or more members having generally longitudinally extending housings, each of said housings including an outer surface and an inner surface defining a hollow passage therethrough and first and second ends adapted and configured to be coupled to any one of a drill head, a drill stem and a starter rod;

electrical insulation means between said members;

an electrically conductive ring disposed within said electrical insulation means, said electrically conductive ring having two or more isolated segments;

a piercing means disposed about the electrical insulation means, the piercing means for piercing through the electrical insulation means to establish electrical contact with at least one segment of the two or more segments beyond the electrical insulation means in response to pressure being applied to the piercing means; and one or more second hollow passages defined through said member, said one or more second hollow passages forming one or more access tunnels for providing a signal flow path.

64. A method for providing an capacitive connection between first and second pipes in a drill string, the pipes including electrical conductors that extend through the pipes, the electrical conductors including electrical contact locations attached to the pipes adjacent the ends of the pipes, the electrical contact locations including a first electrical contact location corresponding to the first pipe and a second electrical contact location corresponding to the second pipe, the first and second electrical contact locations being positioned such that when the first and second pipes are threaded together, the first electrical contact location contacts the second electrical contact location, the first and second electrical contact locations including an electrical ring having two or more isolated segments disposed within an electrically insulative ring, the method comprising:

capacitively connecting the electrical conductors of the first and second pipes by threading the first and second pipes together thereby causing the electrically insulative ring of the first electrical contact location to be brought into contact with the electrically insulative ring of the second electrical contact location.

*65. A drilling apparatus for boring a hole through the ground, comprising:*

*a frame having a longitudinal axis extending from a first frame end to a second frame end;*

*a drill string having a first end adapted and configured to be coupled to a drilling apparatus and a second end adapted and configured for boring a hole through the ground, and said drill string further comprising one or more adjacently disposed members and signal flow path connection means disposed therebetween providing signal continuity between said members, said signal flow path connection means including a first electrically conductive ring, having one or more isolated segments disposed within an electrically insulative ring, said electrically insulative ring separating said one or more isolated segments of said first electrically conductive ring of one member from an electrically conductive ring having one or more isolated segments of an adjacent member to create a capacitance between said one or more isolated segments of said first electrically conductive ring of one member and said one or more isolated segments of said electrically conductive ring of the adjacent member;*

*a drive mechanism mounted on said frame for movement along said axis, said drill string being connected to said drive mechanism for said drive mechanism to rotate said drill string and to longitudinally advance and retract said drill string in response to said drive mechanism moving along said axis;*

*one or more signal flow path means disposed within said drill string, said signal flow path means providing signal continuity between first and second ends of each member and said first and second ends of said drill string.*

*66. A method for providing an capacitive connection between first and second pipes in a drill string, the pipes including electrical conductors that extend through the pipes, the electrical conductors including electrical contact locations attached to the pipes adjacent the ends of the pipes, the electrical contact locations including a first electrical contact location corresponding to the first pipe and a second electrical contact location corresponding to the second pipe, the first and second electrical contact locations being positioned such that when the first and second pipes are threaded together, the first electrical contact location being in close proximity to the second electrical contact location, the first and second electrical contact locations including an electrical ring having one or more isolated segments disposed within an electrically insulative ring, the method comprising:*

*capacitively connecting the electrical conductors of the first and second pipes by threading the first and second pipes together thereby causing the electrically insulative ring of the first electrical contact location to be brought into close proximity with the electrically insulative ring of the second electrical contact location.*

*67. A drill string for boring a hole through the ground having a first end adapted and configured to be coupled to a drilling apparatus and a second end adapted and configured for boring a hole through the ground, comprising:*

*one or more members having generally longitudinally extending housings, each of said housings including an outer surface and an inner surface defining a hollow passage therethrough and first and second ends adapted and configured to be coupled to any one of a drill head, a drill stem and a starter rod;*

*electrical connecting means between each of said members, electrical connection means including a conductive ring on each of said members separated from a conductive ring of an adjacent member by an insulator thereby establishing non-contacting electrical communication between the conductive ring of each of said members and an adjacent member;*

*electrical insulation means between said electrical connection means and said outer surfaces of each of said members; and*

*one or more electrical conductors encapsulated by an electrically insulative material, each electrical conductor being disposed within each of said hollow passages of each of said members and being electrically connected through said electrical connection means to an electrical conductor of an adjacent member throughout the length of said drill string.*

*68. A drill string for boring a hole through the ground, comprising:*

*at least a first drill pipe and a second drill pipe, each of said first and second drill pipes having an outer surface and an inner surface defining a hollow passage;*

*a first conductive element located at an end of said first drill pipe and a second conductive element located at an end of said second drill pipe, each of said first and second conductive elements being separated from one another by an insulator when said drill pipes are mechanically coupled together; and*

*a first electrical conductor electrically connected to said first conductive element and a second electrical conductor electrically connected to said second conductive element, each of said first and second electrical conductors being encapsulated by electrically insulative material and positioned within said hollow passages of said first and second drill pipes;*

*wherein said first and second conductive elements provide a non-contacting electrical connection between said first and second electrical conductors when said first and second drill pipes are mechanically coupled together.*

* * * * *